United States Patent [19]

Chovan et al.

[11] 3,920,951

[45] Nov. 18, 1975

[54] LASER ETCHING APPARATUS FOR FORMING PHOTOGRAPHIC IMAGES ON METALLIC SURFACES

[75] Inventors: Joseph L. Chovan; Albert J. Manoni, both of North Syracuse, N.Y.

[73] Assignee: General Electric Company, Syracuse, N.Y.

[22] Filed: June 3, 1974

[21] Appl. No.: 475,419

[52] U.S. Cl. ........ 219/121 L; 178/6.7 R; 178/6.6 B
[51] Int. Cl.[2] ........................................ B23K 27/00
[58] Field of Search... 219/121 L, 121 LM, 121 EB, 219/121 EM; 178/6.6 R, 6.6 B, 6.6 TP, 6.7 R; 346/74 E; 96/36.3

[56] References Cited
UNITED STATES PATENTS

| | | | |
|---|---|---|---|
| 2,859,652 | 11/1958 | Hopgood | 346/74 E X |
| 3,197,558 | 7/1965 | Ernst | 178/6.6 B |
| 3,301,949 | 1/1967 | Ullery, Jr. | 178/6.6 B X |
| 3,396,401 | 8/1968 | Nonomura | 219/121 LM |
| 3,506,779 | 4/1970 | Brown et al. | 219/121 L X |
| 3,564,131 | 2/1971 | Herold et al. | 178/6.7 |
| 3,636,251 | 1/1972 | Daly et al. | 178/6.6 B |
| 3,679,818 | 7/1972 | Courtney-Pratt | 178/6.6 B X |
| 3,716,668 | 2/1973 | Barron | 178/6.6 B |
| 3,739,088 | 6/1973 | Landsmann | 178/6.6 B X |
| 3,836,709 | 9/1974 | Hutchison | 178/6.6 B X |

*Primary Examiner*—J. V. Truhe
*Assistant Examiner*—G. R. Peterson
*Attorney, Agent, or Firm*—Richard V. Lang; Carl W. Baker; Frank L. Neuhauser

[57] ABSTRACT

An improved laser etching apparatus for forming a photographic image on a metallic or non-metallic surface is described. The apparatus comprises a variable rate, "Q" switched laser, whose beam is focused on one element of a blank at a time. The laser is controlled by means of an apertured photodetector which senses the brightness of an element on a photographic transparency and produces an electrical signal corresponding to the brightness of that element. The electrical signal controls the rate at which the laser produces pulses. The blank is scanned in respect to the etching laser beam simultaneously with the transparency being scanned in respect to the apertured photodetector. The picture produced on the blank contains an assemblage of laser etched craters. In dark regions of the picture, the craters occur in greater densities while in light regions of the picture, the craters occur in lesser densities. The overall appearance of the laser etched image is that of a half-tone print reproducing the transparency.

3 Claims, 4 Drawing Figures

LASER ETCHING APPARATUS FOR FORMING PHOTOGRAPHIC IMAGES ON METALLIC SURFACES

BACKGROUND OF THE INVENTION

1. Field of the Invention

The present invention relates to the etching of photographic images on a metallic surface for direct viewing and more particularly to the etching of such photographic images using a laser.

2. Description of the Prior Art

Several methods are known for etching a photographic image on a metallic surface. One technique has been to use chemical etching. In such a process, a halftone image is chemically etched with the area and depth of etching being controlled in accordance with the local density of the image. The process tends to be difficult to control and the resulting image is highly dependent upon the viewing angle and the nature of the illumination. With specular illumination, the image may change from a positive to a negative and vice versa as the angle of viewing is rotated. The image tends to resemble a tin type.

Recently the use of a laser to machine away an image on a thin metallic film has been suggested. A transparency of appropriate size is illuminated with a high energy laser pulse and the image is focused down to a tiny micro image on the thin film. If the image is small enough, the metallic film thin enough and the energy concentration from the laser high enough, then in the brighter regions of the focused image, small elements of the thin film will be evaporated away. In this manner, a demagnified version of the image on the transparency will be formed on the metal film. A problem with this technique is that the limited amount of energy available from the laser makes it possible only to form tiny micro images which require further magnification for recognition. A further problem is that the metallic films need to be very thin and thus too delicate for many practical applications.

Another approach which has been proposed has been to process a photographic image by means of a computer to achieve a line drawing and then to generate the line drawing on a blank by point by point firing of the laser along each line. The problems of this approach are that rather sophisticated processing of the image is required to obtain a usable line drawing; the scanning equipment is complex and must be computer controlled, and finally the finished product is more like a cartoon line drawing than a half-tone, and so has limited recognizability. The point by point approach has the advantage of being compatible with reasonable laser power levels.

Finally, it is known that one can recreate a photographic image in a printing process by adjusting the density of dark dots on a light field. If the dots are small with respect to recognizable picture elements, the eye will "see" the picture elements and ignore the dot structure.

SUMMARY OF THE INVENTION

Accordingly, it is an object of the present invention to provide an improved apparatus for etching photographic images upon a metallic surface.

It is another object of the present invention to provide improved apparatus utilizing a laser for etching photographic images on a metallic surface.

It is a further object of the present invention to provide an improved laser etching apparatus for creating an image upon a surface in which the image is of convenient size for normal viewing and the laser power requirements are minimal.

It is still another object of the present invention to provide an apparatus for etching an image upon a surface with minimum image distortion.

It is a further object of the invention to provide an apparatus for etching an image upon a metallic surface which is difficult to counterfeit.

It is still another object of the invention to provide an apparatus for creating a photographic image on a metallic surface which is rugged and substantially immune to physical abrasion and high temperature exposure.

These and other objects of the invention are achieved in a novel laser image etching apparatus adapted to transfer an image from an optical transparency to a blank. The transparency is imaged one resolution element at a time upon an optical detector which produces a signal indicative of elemental brightness. At the same time, a pulsed laser having a controllable repetition rate, produces a beam which is imaged upon an optical blank, also on one picture element at a time. The imaging means concentrates the laser energy to form a pit on the blank for each laser pulse, the pits locally altering the reflectivity of the blank. Means such as an X-Y scanning table are provided for scanning the optical detector over the image of the transparency synchronously with the image of the pulsed laser beam over the optical blank, the synchronous scanning occurring at a substantially uniform rate and at a substantially uniform line density. Finally, control means are provided for causing the pulsing rate of the laser to vary as a function of object element brightness so that a greater number of pits occur in regions of the blank which should be dark and a lesser number of pits occur in regions of the blank which should be light. In this manner an optical image is created on said optical blank having light and dark resolution elements representing a similarity transformation of the elements of said optical object. When the scanning table is employed, and both the optical object and the optical blank are supported on it, an identity transformation is created. A similarity transformation occurs when the scanned table supports the optical table, and a magnified or demagnified image of the optical object is imaged thereon.

Scanning may also be achieved by a scanning mirror which may be disposed to provide either an approximate identity transformation or an approximate similarity transformation. A preferred mode of generating the high power laser pulses by "Q" switching with periodic control being achieved by a Bragg modulator.

BRIEF DESCRIPTION OF THE DRAWING

The novel and distinctive features of the invention are set forth in the claims appended to the present application. The invention itself however together with further objects and advantages may best be understood from the following description and accompanying drawings, in which:

DESCRIPTION OF A PREFERRED EMBODIMENT

Figure 1:
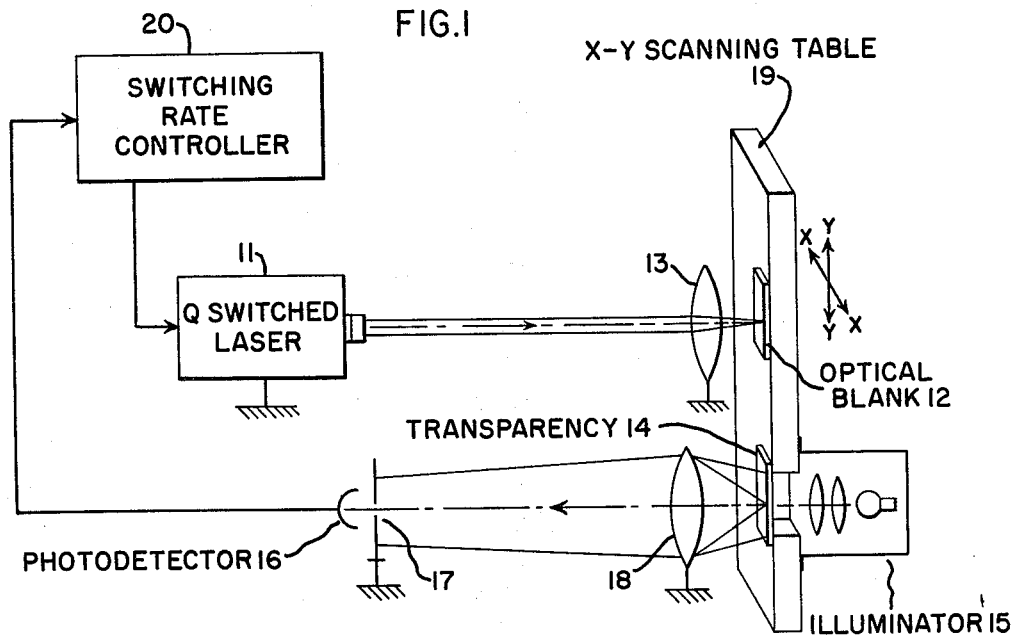
FIG. 1 is a simplified drawing, partially in block diagram form, of a first embodiment of the invention wherein an image on a transparency is etched on a blank by a laser, scanning being achieved by an X-Y table.

A first embodiment of the invention using a laser for etching a photographic image onto a metal is illustrated in FIG. 1. The etching apparatus has as its principal components a variable rate "Q" switched laser 11, an optical blank 12 upon which the laser beam is focused by a lens 13, a photographic transparency 14 which provides the image, and which is illuminated by a light source 15, a photodetector 16 having a pinhole entrance aperture 17 upon which the transparency is focused by lens 18, an X–Y scanning table 19 upon which both the optical blank and the optical transparency are supported, and switching rate controller 20 responsive to the light intensity detected by the photodetector for controlling the switching rate of the laser 11.

The laser 11 produces a beam of high energy monochromatic light, which when focused, is suitable for etching the material on the optical blank. The YAG (Yttrium Aluminum Garnet) laser is satisfactory for etching metals while a $CO_2$ laser is effective for plastics. The beam of the laser is normally from ⅛ to ¼ inch diameter and with additional focusing should be of sufficient energy density for etching the material in question. Focusing is produced by a lens 13, which in this embodiment is a microscope objective having a short focal length and aperture suitable for reducing the laser beam to about 0.001 inches in diameter. The focusing lens 13 is positioned at its focal distance from the surface. The distance of the laser beam to the focusing lens is generally unimportant, since the beam is highly collimated, and neither diverges nor converges appreciably over normal distances.

The laser 11 is normally of the type which is continuously pumped and whose "lasing" may be switched on and off so as to produce a recurrently pulsed output characteristic. "Q" switching is one well known method of pulsed operation. When the Q switch is in one mode, the resonant cavity is opened, precluding lasing. When the Q switch is in the other mode, the resonant cavity is closed and resonant, permitting lasing. Since a variable switching rate is also required, the preferred form of "Q" switching is with an acoustical-optic Bragg modulator. The Bragg modulator is established in the laser cavity and opens and closes the optical cavity over a wide range of instantly changed, repetition rates. Commercially available "Q" switched lasers have pulse repetition rates varying from d.c. to 8 KHz.

For the etching operation, the power level, the duration of the pulse and the laser beam size are controlled so that for each pulse a small pit of approximately 0.001 inches is etched into the surface of the optical blank. With a laser having an average power level of 5 watts and a pulse duration of approximately 1 nanosecond, peak powers on the order of $10^8$ watts per square centimeter may be achieved over these tiny areas. At these power levels, one may etch a metallic blank. With each pulse, the impinging beam causes a rapid vaporization of the blank and forms a small cupped region or crater. Because of its physical configuration, the cupping creates a localized reduction in the observable reflectivity of an otherwise smooth reflective surface. When a uniform distribution of craters is created on a smooth metallic blank, the craters appear to darken the metallic surface under a wide range of lighting conditions. When the density of the cratering is controlled, as will now be described, it can be made to reproduce a photograph having appreciable grey scale.

To achieve a control of the cratering density, the firing rate of the laser is controlled in accordance with an illuminated photographic transparency 14. The firing rate is controlled by the transparency, using the photodetector and the firing rate control means.

The transparency is normally black and white, and may be either a positive or a negative. If in the positive format, electrical phase inversion may be required, while in the usual negative format, it is unnecessary. In an identification (ID) card application of the invention, the transparency may be a facial photograph or fingerprints. The transparency may be of a standard 35 mm. size or larger. A light source for illuminating the transparency is shown schematically at 15 mounted on the scanning table 19. It may comprise a lamp suitable for slide projection illumination and a condenser for producing uniform illumination over the transparency. Since the level of illumination may be appreciably below the levels required for conventional slide projection, and is dictated solely by the sensitivity of the photodetector 16, one may use a less elaborate system, such as one uses for viewing slides. Such a system normally comprises a conventionally coated incandescent lamp, and an intervening ground glass diffusion surface upon which the transparency is placed. If the light source is stationary and does not move with the scanning table, then uniform area illumination is not required. Under this latter condition, the light source is arranged on the common optical axis of the apertured photodetector 16, 17 and the lens 18, and it need only adequately illuminate one element of the transparency at a time.

The lens 18 images the illuminated transparency one element at a time upon the photodetector (16, 17), and the photodetector creates an electrical signal indicative of the brightness of that element. The aperture of the photodetector is normally quite small, being 0.015 to 0.020 inches. The lens 18 is normally placed so as to magnify the picture image several times in the plane of the photodetector aperture. Thus, the resolution element on the photograph may be from 0.002 to 0.007 inches. When the transparency is illuminated, the lighted image is focused on the aperture 17 and impinges on the photodetector 16 where an electrical signal normally proportional to the intensity of illumination of a picture element is created.

The apertured photodetector produces an electrical signal indicating the brightness of the picture element imaged on it and this electrical signal is then applied to the switching rate controller 20 to control the firing rate of the laser.

The switching rate controller typically comprises a stage of optional current inversion, a timing network, a negative resistance device, and a source of output pulses such as a one-shot multivibrator. The timing network uses resistive and capacitive elements which charge at a rate dependent upon the level of the current supplied. Since a bright element in the transparency creates more photodetector current, the firing rate control amplifier may require a current inversion stage to insure that the current supplied to the RC network varies inversely with brightness (if one desires to form a positive image on the blank). The RC timing network is coupled to a negative resistance device, such as a unijunction or field effect device. The latter discharges the RC network once the amount of stored charge rises the voltage to the switching raises of the negative resistance device. Upon discharge, a trigger pulse is produced, the repetition rate of the trigger pulse being dependent upon the charging current levels. Assuming that the trigger pulses are of insufficient energy content for direct laser switching control, the trigger pulses are then used to control a pulse source such as a flip-flop or a one-shot multivibrator. The pulse source is selected to produce pulses having adequate energy content for laser switching. When the output of the flip-flop is coupled to the Q switch input of the laser, the laser will lase for a short nanosecond interval upon the occurrence of each pulse. In this manner, a signal is produced for controlling the firing rate of the laser in accordance with the light intensity of the picture elements on the transparency.

When the input image is scanned over the photodetector aperture, as will now be described, a time variant electrical quantity containing the brightness information of the entire image of the transparency is formed. At the same time, the laser, whose beam is simultaneously scanned over the blank, will have its firing rate controlled element by element to etch the entire image from the transparency upon the blank.

In FIG. 1, the simultaneous scanning means is the X–Y scanning table 19. The table jointly supports the transparency 14 and the blank 12.

The table is provided with a transparent section which supports the transparency on one surface of the table while means for illuminating the transparency are arranged on an opposite surface. As previously noted, the illumination means may either be attached to the table or stationary.

The table may take several conventional forms and so has been illustrated schematically. A typical form is with an X and a Y coordinate lead screw, such as is used for machine tool operations and controlled by a numerical control. The control typically provides a reversing serpentine sequence with indexing occurring at the end of each line. Under this method of scannng, the line interval (the Y coordinate) is made consistent with the desired resolution element size and is normally spaced from 0.002 to 0.010 inches between line centers. The sweep rate along the line (the X coordinate) is normally from 2 to 10 inches per second, consistent with the requirements set by the maximum firing interval (2 to 8 kilohertz) of the laser. The maximum crater density desired for maximum blackness establishes the line sweep rate once the maximum firing interval has been established. Normally, the maximum crater density is selected by subjective reaction. A saturated condition occurs when the firing craters overlap along the sweep line by about 50 per cent since any further increase in firing rate produces little or no observable darkening of the surface. An alternate upper limit occurs when adjacent craters are in tangency. Normally, the maximum blackness is set at some point between these two conditions since the upper limit produces overly saturated blocks. The line space interval is then set at a somewhat greater interval, normally with craters in adjacent lines separate. Normally, the line spacing is selected to make the resolution elements in the image roughly equal along both X and Y axes.

Scanning the transparency simultaneously with the blank makes the reproduction quite accurate from a subjective viewpoint. The transfer of the picture element from the transparency to the blank is distortion free and this is true irrespective of the quality of any of the lenses or inaccuracies in the sweep rate of the line interval in the scanning process. In the FIG. 1 embodiment, the laser lens 13 is required to image the laser beam only on one element of the blank at a time. Similarly, the lens 18 is required to image only one picture element on the aperture of the photodetector at a time. Thus, the requirement for lens quality is smaller than if larger areas were involved and the scale of the error is below the point at which the eye will normally detect it. Similarly, if the sweep rate or the line interval should vary, the same positional variation will occur both on the transparency and on the blank. As a result, any picture element which is transferred from the transparency will always be in its proper place on the blank. While sweep rate variation or line interval variation may theoretically cause variation to the grey scale of the image, an image element must vary by a factor of the square of 2 in intensity before the eye will sense the error. Such a variation in sweep rate or line interval is readily avoided in even the simplest of scanning systems. Hence, variations in grey scale from these causes are generally imperceptible.

The image which is formed on the blank by the laser is unique and not readily duplicated. Viewed with the unaided eye, successive laser reproductions of the same transparency would be hard to distinguish. Generally, they would look the same. However, at the microscopic level, due to a small random variation in the laser pulsing arising partly in the photodetector network, partly in the timing network, partly in the Bragg modulator and partly in the "Q" switching operation, there is very substantial noncorrespondence between any two laser reproductions. That difference may be brought out by correlation or comparison techniques. If one would wish to reproduce the microscopic structure of the laser reproduction, it would be an extremely difficult task, requiring a forbidding degree of precision in control of the pulsing rate. Accordingly, once the blank is photographed with adequate resolution to resolve the microstructure of the picture, the blank may be placed in circulation with substantial confidence that an undetectable duplicate of the original blank will not be made. Typically, photographic comparison is based on a correlation technique to which the successive photographs are superimposed, often with one positive and the other negative and then viewing the two in an optical system to portray differences. Viewed by this technique, there is such a substantial decorrelation between successive laser renderings of the same transparency that detection of a counterfeit is simple.

In the FIG. 1 embodiment, the laser 11, the lenses 13, 18, the apertured photodetector 16, 17 are stationary, while the blank 12 and the transparency 14 (and sometimes the illuminator 15) are disposed on the X–Y scanning table. The arrangement creates a unity magnification in the transfer of the image from the transparency to the blank.

Figure 2:
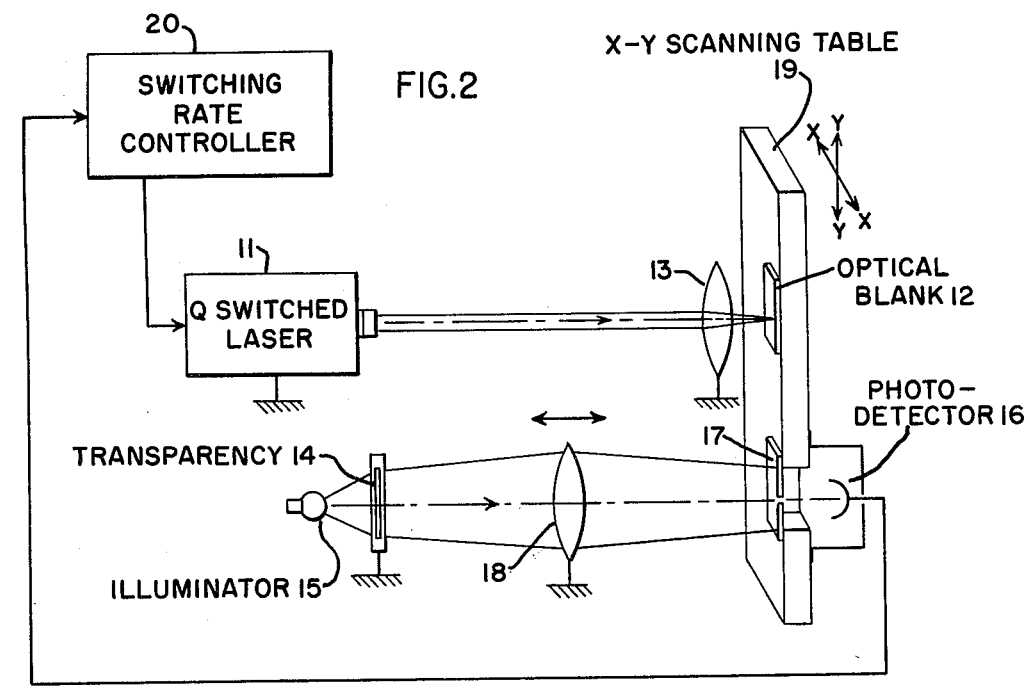
FIG. 2 is an embodiment using similar components to that in the embodiment in FIG. 1 wherein the image formed on the blank may be either a magnified or demagnified version of that on the transparency.

A different arrangement is illustrated in FIG. 2. In the FIG. 2 embodiment, the laser 11, the lenses 13, 18, the transparency 14 and the illuminator 15 are stationary while the blank 12 and the apertured photodetector 16, 17 are disposed on the X–Y scanning table. This arrangement creates a magnification or demagnification in the transfer of the image from the transparency to the optical blank. If the imaging lens 18 is properly placed in relation to the transparency to form a large real image on the surface of the X–Y scanning table, then the photodetector will sense elements of the large image, and the blank will be etched on a correspondingly increased scale. Demagnification may also be achieved by properly positioning the imaging lens to form a reduced image on the surface of the scanning table.

A third embodiment of the invention may utilize an orthogonally scanned mirror to achieve simultaneous scanning of the blank and the transparency. In the FIG. 3 arrangement, the elements have retained the same reference numerals as were used in FIGS. 1 and 2: the switching laser being shown at 11; the optical blank being shown at 12; the laser imaging lens being shown at 13' (the prime denoting that a long focal length lens is used in this configuration); the transparency being shown at 14, with the illumination source being shown at 15. The imaging lens for the photodetector is shown at 18 and the apertured photodetector is shown at 16 and 17. The scanning mirror is shown at 21. It is arranged to be scanned along two orthogonal axes in a serpentine manner similar to the X–Y scanning table of the FIG. 1 and FIG. 2 embodiments. The rotating mechanism may take the conventional form used for machine tool control. The laser imaging lens must be of a relatively long focal length, since it must be positioned between the mirror and the laser, and thus a relatively large distance from the blank. The resolution requirement, however, is met with a lens of relatively small aperture.

Figure 3:
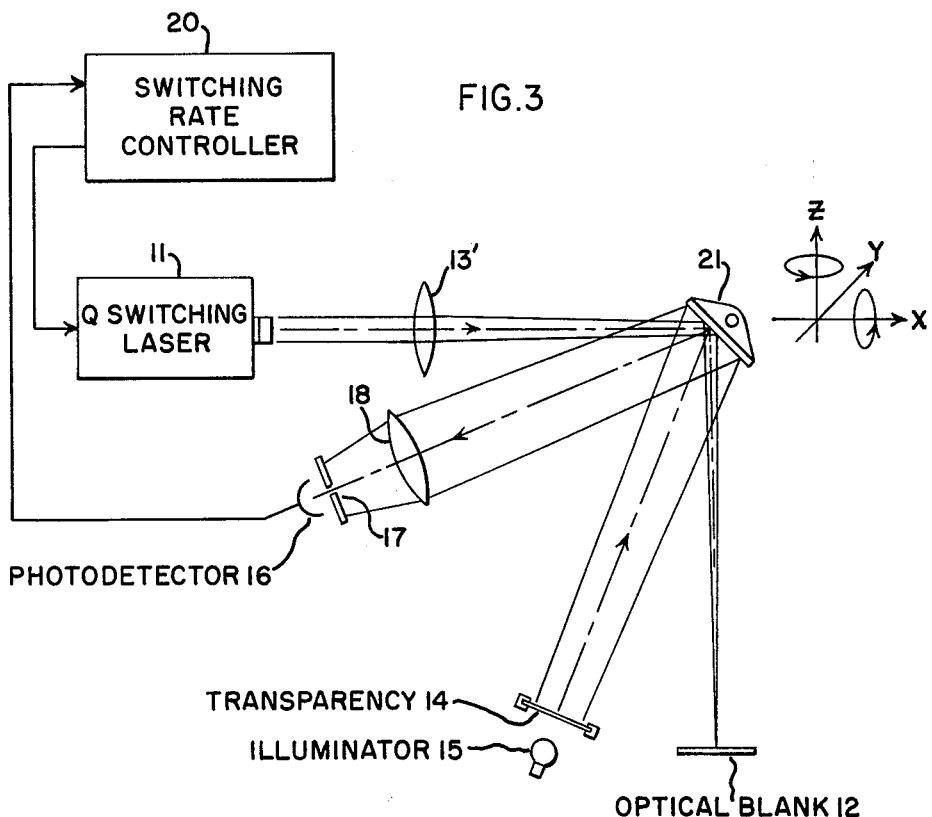
FIG. 3 is a simplified drawing of a third embodiment using a scanning mirror instead of a scanning table to produce an approximate identity transformation.

The arrangement of FIG. 3 produces a one to one magnification in image transfer to the blank. If one wishes to produce a magnification or demagnification, the FIG. 4 arrangement may be used. In this arrangement, the same elements are used as were used in the FIG. 3 arrangement. In the FIG. 4 arrangement, the scanning mirror 21 is arranged between the imaging lens 18 and the apertured photodetector 16, 17. Thus, an enlarged image of the transparency is scanned by the mirror, and transferred in enlarged condition on the photodetector 16. The imaging lens 18 may be disposed so as to either magnify or demagnify the image, and so create either an enlargement or a miniature of the transparency upon the blank.

The arrangements of all four embodiments exhibit minimal geometric distortion in transferring the image from a transparency to the blank. No error is attributable to nonlinearity in the sweep waveforms. The arrangement in FIG. 1 produces an ideal "identity transformation" in that the displacements of the transparency and of the blank are precisely equal in the scanning process. In other words, all distances are accurately transformed. Any geometric distortion of the lens is avoided since they are used to form an image of only one element at a time — normally on the same lens axis and do not image the whole field. The arrangement of FIG. 3 approaches this same accuracy in transformation provided that the angular disposition of the photodetector and the laser are about the same (and in the angular disposition of the blank and transparency are about the same). Since two elements cannot occupy the same place at the same time some slight displacement is necessary and the transferred image may show some shortening in the X or the Y dimension. This normally can be corrected by a slight screwing of the blank (or the transparency) in respect to the axis of the system so as to make the scanning distances on the transparency substantially equal to those on the blank.

Figure 4:
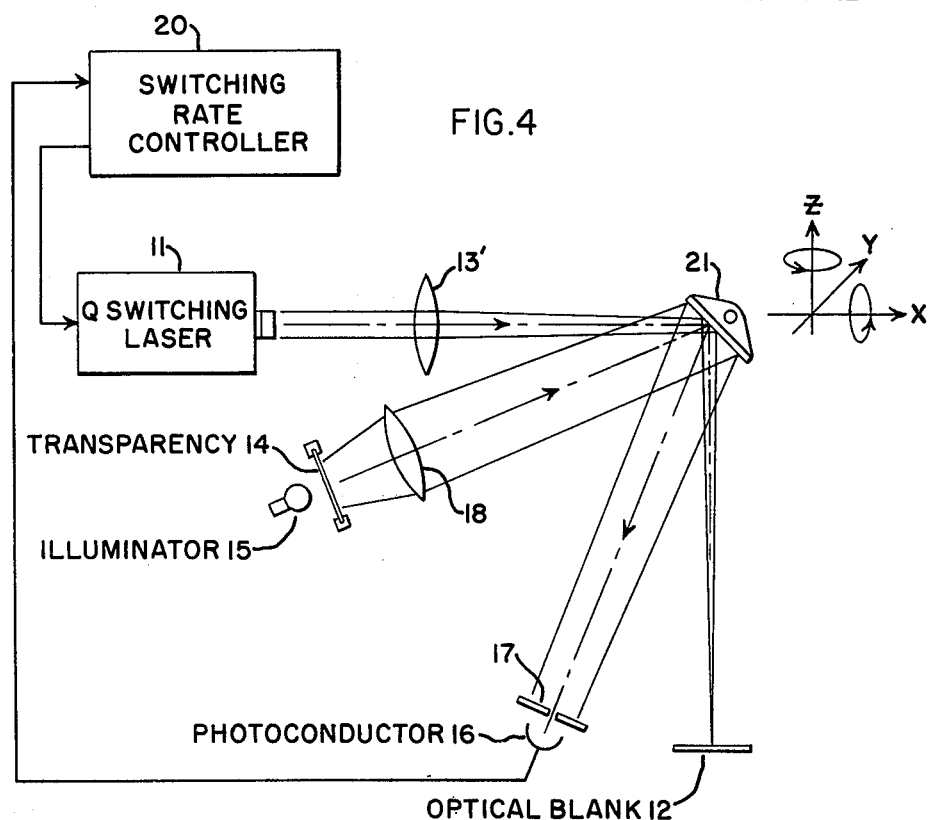
FIG. 4 is a fourth embodiment using similar components to that in FIG. 3, wherein the image formed on the blank may be either a magnified or demagnified version of that on the transparency.

The arrangement in FIGS. 2 and 4, which produce magnification or demagnification of the image will produce a "similarity transformation" of which the "identity transformation" is a special case. In the "similarity transformation" all distances are transformed at a fixed ratio. The accuracy of the similarity transformation is limited only by the geometrical accuracy of the lenses. If good quality lenses are employed, then a substantially perfect similarity transformation is performed.

The images produced in the manner herein disclosed are normally viewable over a wide variation of lighting conditions. The image has the greatest contrast with specularly reflected light and has a normal range of contrast corresponding to typical photographic prints, when viewed in conventional diffused light. When the laser power is properly adjusted to insure deep enough pits, image reversal, as the viewing angle changes, is minimized. When viewed closely, the image has a few scattered pits in light areas not corresponding to dark elements in the picture. These arise from the integrating nature of the encoding process. When viewed from a distance the effect is to create the correct average shading for that portion of the picture. The distribution is more random in light areas but does not cause any appreciable distortion in the geometrical accuracy of the image. In general, the rendering of a photographic image by the present apparatus results in a picture quality approximating that of a half-tone print and with a corresponding degree of recognizability.

What I claim is:

1. Laser image forming apparatus comprising:
    a. means for supporting an optical object thereon having light and dark resolution elements,
    b. an optical detector electrically responsive to the brightness of small surface elements imaged thereon,
    c. means for imaging single resolution elements of said optical object upon said optical detector to produce electrical signals indicative of the brightness of said elements,
    d. an optical blank of a material suitable for laser etching,
    e. an electrically controllable laser for producing a short duration optical pulse of high energy content and capable of a periodic control over an appreciable range of repetition intervals,
    f. means for optically concentrating the energy in the beam of said laser on said blank to form a tiny pit in said blank for each laser pulse, said pits locally altering the reflectivity of said blank in respect to the unpitted surface,
    g. means for scanning said detector over the image of said optical object simultaneously with scanning said pulsed laser beam over said optical blank at a uniform rate, said scanning means comprising:
        1. a mirror scanned through a solid angle, and wherein
        2. said optical object and said optical detector are arranged on a first pair of reciprocally reflective paths in respect to said mirror, and
        3. said optical blank and said pulsed laser are arranged on a second pair of reciprocally reflective paths in respect to said mirror, and h. control means responsive to the output of said optical detector for causing the pulsing rate of said laser to vary as a function of object element brightness to create an optical image having light and dark resolution elements on said optical blank representing a similarity transformation of the density of said optical object.

2. The arrangement set forth in claim 1 wherein said mirror is arranged between said object and said object imaging means to cause an approximate identity transformation.

3. The arrangement set forth in claim 1 wherein said mirror is arranged between said photodetector and said object imaging means, said object imaging means being disposed to produce a similarity transformation.

* * * * *